Figure 7:
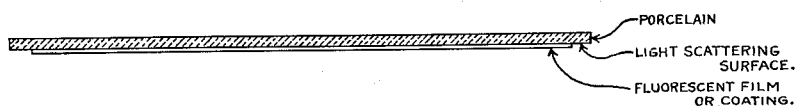

P. C. HEWITT.
ART OF LIGHTING.
APPLICATION FILED SEPT. 18, 1909.
1,150,118.
Patented Aug. 17, 1915.
6 SHEETS—SHEET 1.
*Fig. 1*
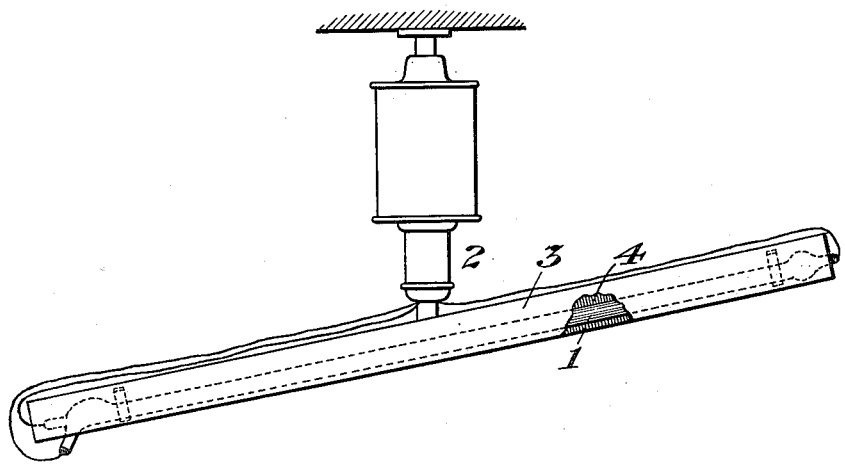
*Fig. 1ᵃ*
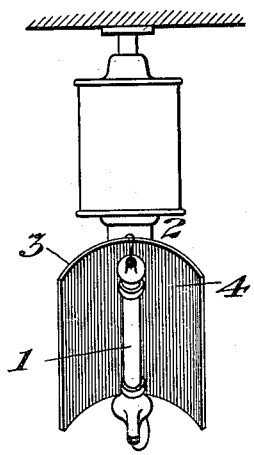
WITNESSES:
Chas. F. Clagett
Thos. H. Brown
INVENTOR
Peter Cooper Hewitt
BY Charles A. Terry
ATTORNEY

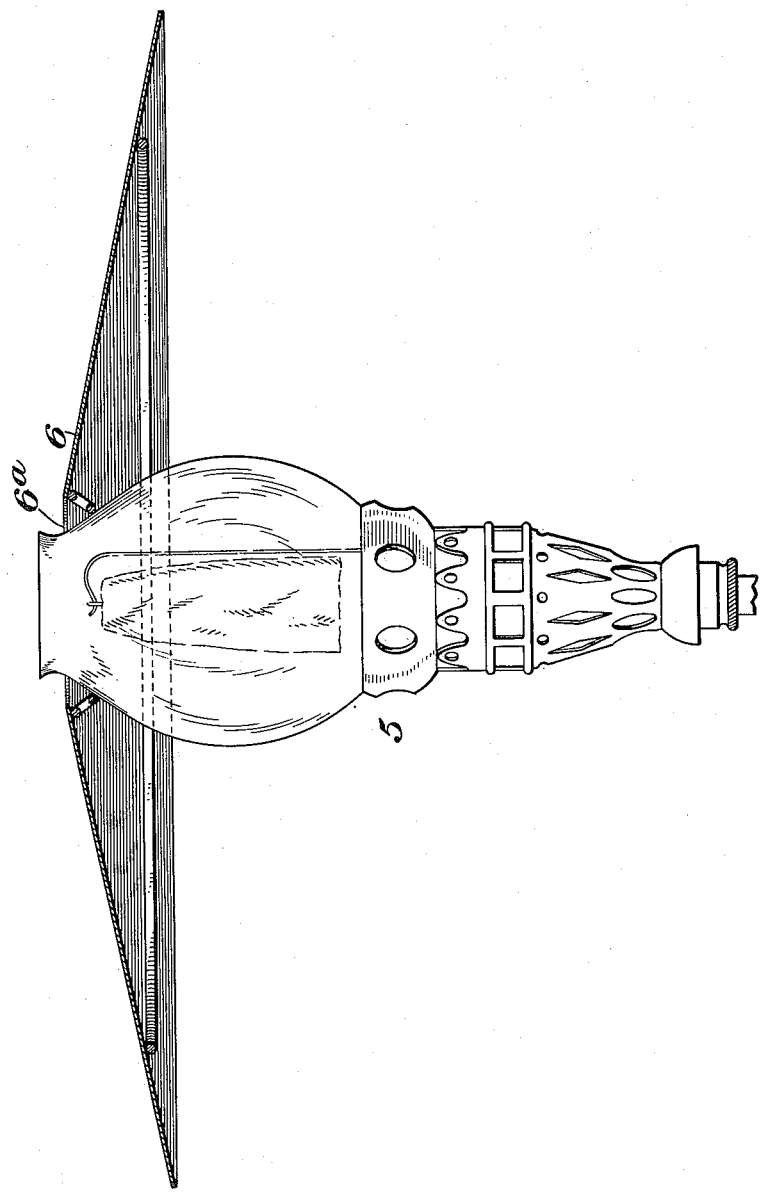

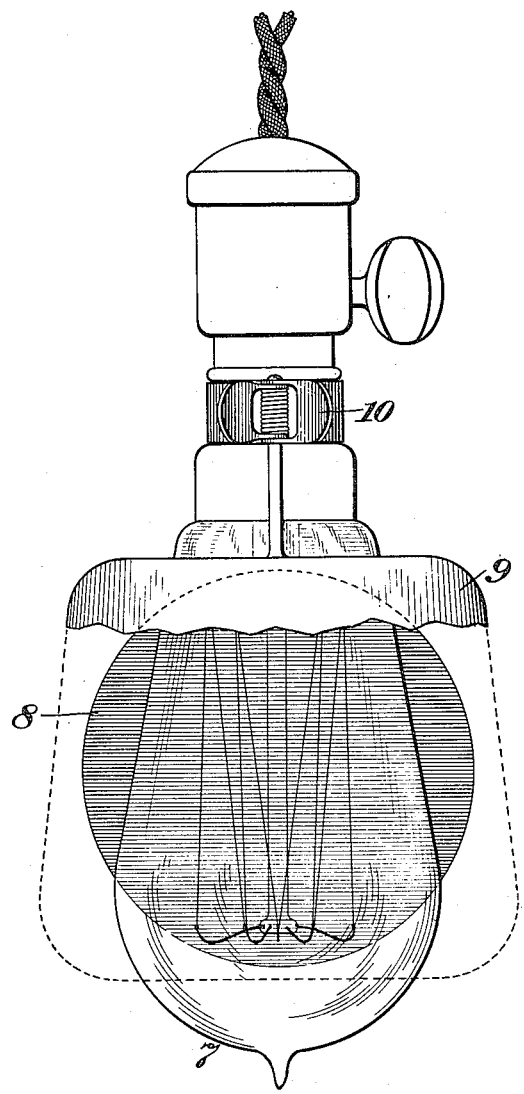

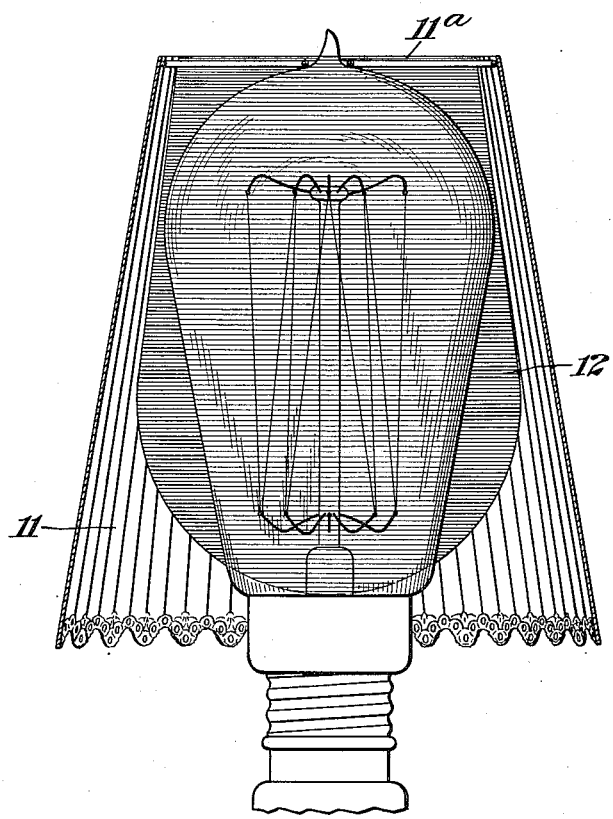

P. C. HEWITT.
ART OF LIGHTING.
APPLICATION FILED SEPT. 18, 1909.
1,150,118.
Patented Aug. 17, 1915.
6 SHEETS—SHEET 5.
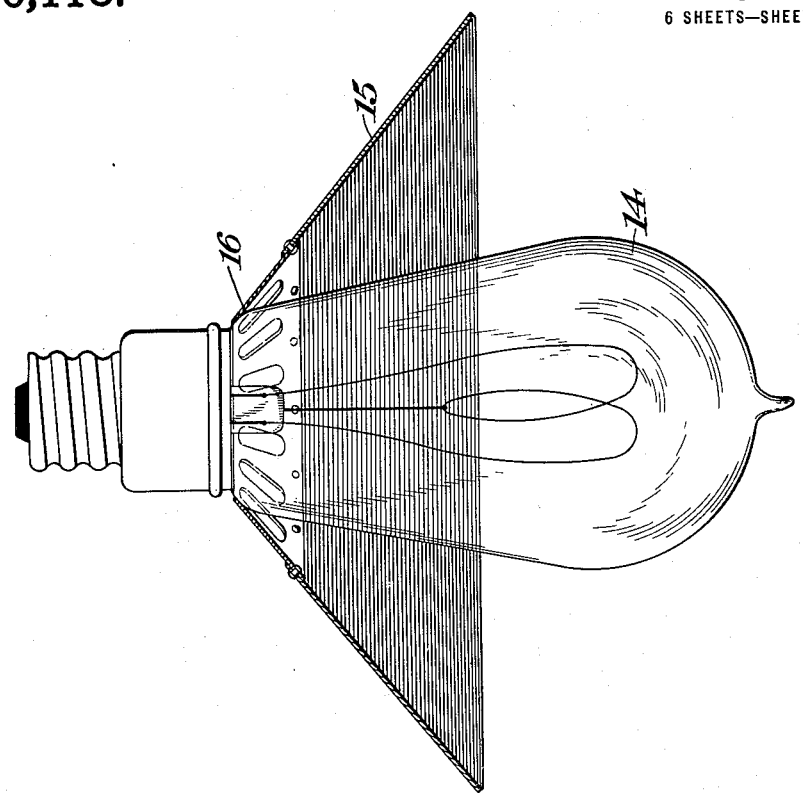
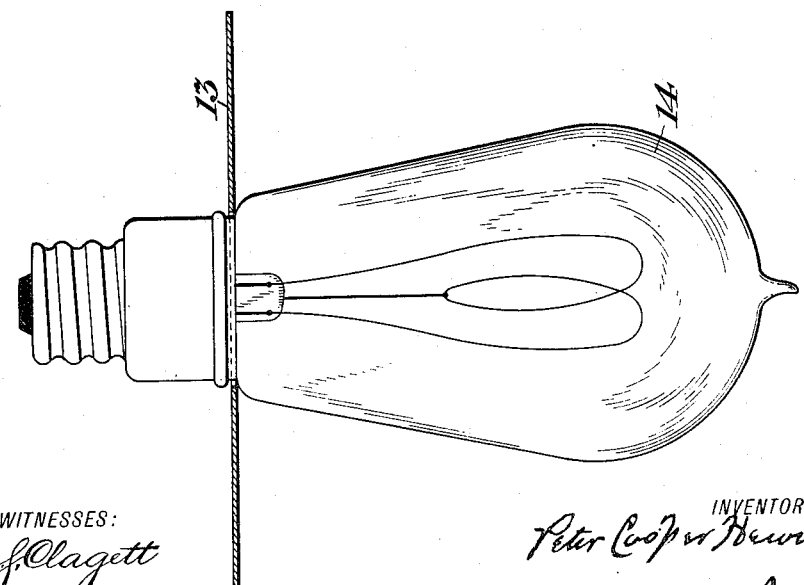
WITNESSES:
Chas. F. Clagett
Thos. H. Brown
INVENTOR
Peter Cooper Hewitt
BY Charles A. Terry.
ATTORNEY

P. C. HEWITT.
ART OF LIGHTING.
APPLICATION FILED SEPT. 18, 1909.

1,150,118.

Patented Aug. 17, 1915.
6 SHEETS—SHEET 6.

WITNESSES:
Chas. F. Clagett
Thos. H. Brown

INVENTOR
Peter Cooper Hewitt
BY
Charles A. Terry
ATTORNEY

UNITED STATES PATENT OFFICE.

PETER COOPER HEWITT, OF RINGWOOD MANOR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

ART OF LIGHTING.

1,150,118.     Specification of Letters Patent.     Patented Aug. 17, 1915.

Application filed September 18, 1909. Serial No. 518,325.

*To all whom it may concern:*

Be it known that I, PETER COOPER HEWITT, a citizen of the United States, and resident of Ringwood Manor, county of Passaic, State of New Jersey, have invented certain new and useful Improvements in the Art of Lighting, of which the following is a specification.

My invention comprises certain improvements in the art of lighting, for increasing certain color values from a source of light, and more particularly to producing a means for transforming light waves from a source into light waves of a desired character, and means for emitting the transformed waves so as to add light of certain color value or wave length to the light emitted from the source, supplementing it by means of transformed waves, so that the resultant combined light has a desired color value.

In a patent for producing colored light rays, issued on December 22nd, 1908, No. 907,598, I have described certain methods and means for obtaining a transformation of light waves of certain wave lengths into rays of other wave lengths; that is to say, converting certain rays of one spectrum into rays yielding a different spectrum, by means of fluorescence, and for mingling the resulting converted waves with those from the source of light. In said prior patent, I described the invention as applicable to cases where a source of light is deficient in some desired portion of the spectrum, and illustrated the broad method as applied in a case where light is deficient in a desired portion of the spectrum.

My present invention relates to certain improvements, both with respect to the broad subject-matter of producing different colored light by transforming rays from any light which is deficient in some portion of the spectrum deemed desirable for illumination, and also with respect to the more specific case of increasing the red rays by transforming the energy of light of shorter wave lengths into light of longer wave lengths in connection with any source in which either a greater amount or a greater proportion of red light is desired.

I have found that economical and efficient light transformers can be produced by using a material capable of promoting fluorescence and supporting the same in a carrier in connection with means for enabling the material to develop its fluorescent properties, and means for enabling light transformed thereby to be liberated or emitted therefrom. Fluorescence appears to be more readily obtainable in a liquid than in a rigid solid, and I have observed that when a beam of suitable light is allowed to impinge upon solutions containing a certain percentage of fluorescent dyestuff, the latter can exert its fluorescent properties to a high degree, but the use of liquids as light transformers under practical commercial conditions is attended by obvious disadvantage. On the other hand, I have discovered in producing light reflectors or filters by using binding materials to form a paint or film, these materials may not permit the fluorescent material to exert its property of fluorescence to the fullest extent when used alone, and that it is desirable to incorporate therewith a promoting medium which will so alter the state of the carrier or binder as to permit the fluorescent material to fulfil its functions as a light transformer.

One of the features of my present invention consists in bringing the fluorescent material into a medium which is solid and strong enough for mechanical purposes, and yet the conditions are such that fluorescent material is allowed to develop its characteristic action. The latter conditions are attained by the use of a promoting material incorporated in the carrier for the purpose of modifying its nature to bring about this result.

From the above explanation, it will be seen that in order to construct an economical light transformer having mechanical properties suitable for practical commercial use, three components become necessary: (1) A material capable of promoting fluorescence; (2) a carrier or binder; and (3) a medium which added to the carrier promotes the fluorescence of the material by modifying the condition of the carrier. And, further, I have found that a medium or means affording reflector surface or surfaces of the light diffusing or light scattering type exercises an important function with respect to efficiency or fluorescent materials when used for transforming light in assisting them to emit the transformed rays, whether in solid or liquid solution or mixture. This surface effect may be made effective by reason of the physical nature or form of the material or mixture itself or by reason of its relation to other material associated with it, whereby the required surface relation is created. The conditions under which the relation is attained in practice seem to justify the theory that the impinging light rays being transformed and as it were re-originated in the substance of the fluorescent material are propagated at many different angles and some of these are angles which bring the light back to the emitting surface at angles of total internal reflection therefrom, and in the case of a film having smooth parallel surfaces any such rays may be internally reflected and re-reflected until partially or wholly dissipated. If, however, the surface or surfaces in contact with the rear of the film, or, in certain cases, the internal surfaces, are efficient reflectors of the non-assorbent, light scattering type, of which the most typical is a brilliant white surface, any rays totally reflected from the exterior surface and returning therefrom find in their path an efficient reflector, which being light scattering will turn back the light toward the emitting surface at angles, most of which will be angles of emission. If it should happen that some portion of the light thus turned back again strikes the emitting surface at an angle of total reflection and returns again toward the rear, it will be again efficiently dispersively reflected toward the emitting surface. Thus with a thin film of fluorescent medium practically all of the light reaches the surface at angles of emission, after traveling through the fluorescent medium distances which are great as compared with the thickness of the film. In this way the fluorescent medium is employed so as to insure the utmost efficiency both as to its transformed action and as to its light emitting capacity. In case the fluorescent material is carried by a translucent carrier, this effect may be produced by making the surface or backing on which it is held a light dispersing or a light scattering reflector, as distinguished from an image reflector, the reflecting material itself being relatively opaque. It may be explained with reference to what I have termed image reflectors, that they include all polished mirrors or mirror like surfaces even when made irregular, as in the case of ordinary corrugated or crinkled tin or tinfoil, which do not serve to produce even approximately the conditions afforded by material of essentially light scattering structure, such as white calcimine, or porcelain or even useful approximations thereof. I account for this on the theory that where the corrugations or wrinkles of the tin or tinfoil are of such size that the fluorescent coating approximately follows the shape of the tin, the situation and functioning is that of plane mirror or image reflection, that is to say, the light is either reflected directly out of the fluorescent film and thus travels through the minimum thickness thereof or if reflected so as to have a longer, more efficient, path is totally reflected from the inner emissive surface and is lost. It may also be explained with reference to the substances or materials suitable for light dispersing or light scattering reflector purposes, that the functioning for purposes of the present invention requires that the material be essentially light reflecting as distinguished from light absorbing. Nearly all solid bodies reflect some material fraction of the light which falls upon them, for otherwise they would not be visible to the eye, and such reflection is light scattering or otherwise they would not be visible from all directions, but most of these absorb more light than they reflect and would never be selected for my purposes. The best test of usefulness of materials, is afforded by the eye, the substances or materials having the most brilliant white appearance, and useful approximations thereof, being indicated as desirable provided of course they are physically and chemically adapted for the purpose. In general, light absorbing surfaces and surfaces formed of substances suitable for producing phosphorent effects would not be employed for my purposes. In this case the fluorescent material is associated with another surface of such character as to cause light rays transformed by it to be emitted or liberated from it. In some cases the light dispersing surface may be more intimately associated with the light transforming material by causing the material itself to possess such surface by reason of its physical form or condition, or by incorporating in the carrier a material providing such surface. The function of light dispersion may be produced by one composite substance instead of by a light scattering body separate from the fluorescent material.

As a desirable embodiment of my invention, I may employ collodion, or other cellulose compound, or gelatin or glue as a translucent carrier, and the material which I have called the promoting medium, may consist of castor oil or other suitable material in the case of collodion, and glycerin in the case of glue or gelatin. By use of such materials, the fluorescence material is caused to exhibit its fluorescent properties to a remarkable extent, while in a practically solid state.

I have devised various special forms of reflecting devices and means of applying the same to different forms of lamps for securing a resultant illumination pleasing to the eye. The lights produced by most, if not all artificial illuminants, are deficient in portions of the spectrum with respect to many of the purposes for which they are used, and such deficiencies may be corrected by my invention. Hence, my invention is applicable, not only to Cooper Hewitt lamps or mercury vapor lamps, but also to other illuminating sources, including Welsbach mantle lamps, incandescent filament lamps, such as tungsten and tantalum lamps and ordinary carbon filament lamps, and to arc lamps, and also to daylight.

In case of the mercury vapor lamp, it has long-been recognized that in view of its many economical advantages, a light transformer capable of converting some of the rays emitted by this lamp into rays of longer wave lengths would be extremely useful, because it would permit the mingling together of the rays of various wave lengths in the proportion desired and thereby supplementing the spectra and making possible the production therefrom of a light approximating ordinary daylight. In the several other illuminants of commerce, it is often desirable to add certain rays so as to reinforce the spectrum, and in such cases my invention is applicable and useful.

As an example, the above results may be achieved by selecting rhodamin such as rhodamin B or rhodamin G of commerce, as the flourescent material in constructing a light transformer in accordance with my invention in the manner hereinafter described. With this dyestuff incorporated in a carrier mixed with the promoting medium as aforementioned, it is possible to transform the rays emitted by a mercury vapor lamp into other rays, so that the mixture of the rays emitted by this material with untransformed rays directly emitted from the lamp, will so supplement the normal spectrum that the resultant light may be made to resemble ordinary daylight to a remarkable extent, and for some purposes may be made even more desirable.

In preparing the active material of a light transformer in accordance with my invention, a small quantity of fluorescent material together with the promoting medium, such as castor oil is dissolved in a solution consisting of the carrier dissolved in a suitable solvent in suitable proportions, and I will now describe for the purpose of illustrating my invention, two examples of the manner in which it may be carried out with materials requiring different solvents.

*Preparation of the active material for light transformer using collodion as a carrier.*—The fluorescent material, for instance, rhodamin B is dissolved in absolute alcohol. The color goes into solution and the solution is then filtered to free it from other matter, such as glucose or dextrin, sulfate of soda, etc., which may be associated with such dyestuffs as obtained in commerce. To a solution of collodion there is added a quantity of castor oil varying from several per cent. up to say eightly per cent. or more of the dried collodion solution, beyond which the material tends to become sticky. A suitable quantity of the solution of rhodamin B in alcohol is then added and a film prepared, either by pouring the solution so obtained on a sheet of glass, from which it may be stripped, or by painting on paper or porcelain or other suitable foundations having a light dispersing reflecting surface. The film or coating is allowed to dry and is then ready for use in the manner hereinafter described as the active material for a light transformer. Excellent results are obtained by preparing a coating as follows: To two hundred and fifty (250) grams of collodion containing five per cent. (5%) to six per cent. (6%) of solid matter dissolved in alcohol and ether, representing about twelve (12) grams of solid matter, is added from five (5) to twenty (20) grams of castor oil and six-tenths ($\frac{6}{10}$) of a gram of a ten (10%) per cent. alcohol solution of rhodamin B; this solution containing, therefore, six one-hundredths (6/100) of a gram of rhodamin B. These amounts may be changed by reason of commercial or other requirements without departing from the spirit of the invention. Instead of rhodamin B, another rhodamin as rhodamin G may be employed. Care should be taken to have the collodion as free as practicable from water, as water tends to impair or render uneven the coating when applied to a surface, on drying. The materials as above referred to, are mixed carefully and formed into a more or less viscous liquid for preparing the active material of a light transformer. Two or three rapidly flowed coatings successively applied, will give good results.

As stated above, there are various ways of using this coating material; one is to coat it directly upon a reflecting surface which is practically impervious to light waves, and at the same time not an image reflecting surface and for this purpose the use of a mat surface has certain practical advantages, although a very smooth light scattering surface appears more efficient. White paper may serve as a backing. A good surface may be obtained by a coating of white lead, zinc white, magnesia, or French white, upon a suitable foundation, such, for instance, as paper, pasteboard, metal or other material. The white may be mixed with the gelatin and glycerin in convenient proportions and a suitable quantity of water added for applying to the foundation. I have found, for instance, a mixture of a suitable quantity of gelatin, say thirty parts (30) with twenty parts (20) of glycerin and three hundred parts (300) of white lead and about two hundred parts (200) of water, serve to make a calcimine well adapted to the purpose. The calcamine may be applied to the surface by flowing or by a brush, and when dried, the glue, gelatin or collodion mixture containing the light transforming medium is applied in like manner to the coated surface and allowed to dry. The gelatin calcimine has the advantage of being non-absorbent for the collodion mixture, if the latter does not contain too much water, thereby giving a good surface contact. Care should be taken to avoid the presence of air bubbles and to secure a smooth, even distribution of the collodion mixture. It will, of course, be understood that the proportions of materials employed may be variously modified within reasonable limits, but those mentioned afford very excellent results. Instead of coating a surface with calcimine, a film may be formed, the reverse side of which may be coated with the calcimine, and the whole attached to a support.

I have found that excellent results may be obtained where the diffusing surface is incorporated in the light transforming material. This may be accomplished by mixing the zinc white or opaque reflecting material with the collodion-rhodamin mixture. The material may be made in a film and coated on a suitable backing, if desired. Without attempting to explain accurately the action which takes place, the indications are that when the light transforming material has image reflecting surface or is coated directly upon an image reflector surface, the transformed light rays are not freely emitted from the light transformer; when, however, it is associated with a light-dispersing surface as when the material is light scattering or the surface in contact with the varnish is light-scattering, the transformed light waves are more freely emitted and may be readily combined with the rays from the origin. This seems to be true when a reflecting material is mixed with the light transformer, although in the latter case, there would appear to be a somewhat lower efficiency of emission probably due to the fact that a portion of the transformer is then occupied by such material.

An example of dispersive reflection in the active material, due to its physical condition or form, may be had by taking the above described collodion castor oil-rhodamin mixture made by alcoholic solution, and rapidly mixing it with water as by a jet, in which case the material tends to become fibrous in physical structure, and, when dry, it may be further comminuted for use as a powder.

*Preparation of the active material for a light transformer using gelatin or glue as a carrier.*—When gelatin is used as a carrier, a quantity of transparent gelatin is dissolved in water. Glycerin to the amount of about twenty-five per cent. (25%) of the dry weight of gelatin is added to the solution, together with a suitable quantity of rhodamin G, prepared as above, or other suitable fluorescent material. The amount of glycerin depends on the quality of the glue or gelatin, it being advisable to use as much glycerin as commercial practice will permit. Rendering the gelatin acid as by acetic acid assists the fluorescence promoting action. This solution is used to prepare a film or may be spread on a surface composed of efficiently reflecting light-scattering material as for instance white paper, porcelain, etc. The film is allowed to dry and is used as a light transformer in the manner herein described.

When made in accordance with the preferred method herein set forth, the composite material constitutes a flexible solid or semi-solid elastic body, which consists of a fluorescent material, a solid carrying material, and a promoting material. There is reason to believe that the association of the materials should be such that the fluorescent material remains as if in solution and diffused through the carrying material, thus aiding fluorescence in the carrying material and rendering the composite body more flexible and elastic to conditions permitting free vibration and development of fluorescence therein.

The light transformers obtained by the above methods, are suitable for transforming certain non-red rays into rays of yellow, orange, and red color. Other materials may be used for other colors; eosin for yellow and some reds, for instance, while uranin gives its characteristic color. The light transformers are supported in such a position that a portion of the rays from the lamp impinge thereon and are transformed and reflected to the surroundings and in so doing become mixed with the direct light emitted. It is important that the material of the device should not become overheated beyond its active temperature and its location with reference to the source of illumination should be determined with reference to the characteristics of the material and the intensity of the source of light, so that the heat and light shall not be great enough per unit area of material, to impair its useful commercial durability.

While it is desirable to use a highly reflecting dispersive in connection with the light transformer when it is in the nature of a film prepared in the manner described, useful results may be obtained by employing simply white paper or other non-image reflecting surface as a background.

When the film has been formed on a glass plate and the film afterward stripped off and applied to a dispersing reflecting surface, great care should be taken to insure a perfect surface contact between the two surfaces and in order to obtain best results the surface contact should be sharply defined and the union definite. In the case of its use as a coating material after the manner of a paint or varnish, it is preferably that the dispersing surface should not be absorbent, in order that a sharp surface contact be insured between the coating and the surface whereby a high efficiency is promoted. The above referred to relations of the light scattering surface to the active material holds irrespective of whether it is used in the form of a backing or as intermixed particles and irrespective of whether the surfaces are glossy or not. A white porcelain plate forms a very suitable background.

It will be clear from the foregoing that by means of my invention light from any source may be enriched by any wave length obtainable from fluorescent material by the use of a suitable carrier and a light dispersing reflecting surface associated therewith to form a reflector after the manner above described.

In the accompanying drawings I have shown an application of my invention.

Figure 8:
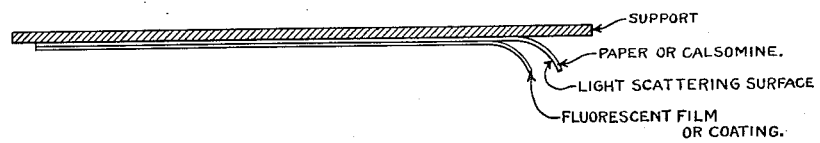
Figure 9:

In the drawings Figures 1 and 1ª are side and end views showing the invention as applied to a mercury vapor lamp. Fig. 2 is an elevation of a Welsbach mantle light showing a reflector in section; Figs. 3, 4, 5, and 6 are similar views of various forms of filament lamps showing various forms of my invention applied thereto. Figs. 7, 8, and 9 are exaggerated or schematic views intended to illustrate some of the functional relations in various of my fluorescent reflecting devices and materials.

Referring to Fig. 1; 1 represents a source of light, such as the mercury vapor lamp, and 2 represents a suitable holder for supporting the lamp. This holder also carries the frame 3, carrying a reflector 4, constructed in the manner hereinabove described. The reflector shown is curved transversely, and in case the curvature approximates an arc of a circle, its center of curvature is preferably remote from the axis of the lamp. For instance, in Fig. 1ª, the reflector being less than a semi-cylinder, its center of curvature would fall considerably below the axis of the lamp. The shape of this cross-section may be varied within wide limits, however, the shape being adapted generally to its distance from the source of light and to the space to be illuminated.

In Fig. 2, 5 represents a well known type of Welsbach lamp and 6, a reflector placed above the same, serving to transform a portion of the rays emitted by the mantle and to cause them to mingle with those proceeding direct from the mantle. The effect is to add very largely to the red rays and thus render the illumination very closely like that of sun-light. An annular ventilating space 6ª is provided adjacent the chimney, to prevent overheating.

In Fig. 3, 7 represents an incandescent lamp having a metallic or other well-known form of filament and 8 represents a fluorescent reflector upon one side of the lamp, the support 9 being broken away to show this. The support 9 is held in place by an ordinary spring clip 10.

Fig. 4 illustrates a similar lamp having a more or less transparent shade 11, held by a wire support 11ª, and having a relatively small transforming reflector 12 inserted within it for adding the requisite red rays.

In Fig. 5, a substantially plane annular reflector 13 is shown as placed above an ordinary carbon filament lamp 14.

In Fig. 6, the reflector 15 has the shape of a truncated cone, thus acting partly as a shade or screen so that it intercepts and transforms a greater proportion of the light than does the shade of Fig. 5. The addition of the red rays may be such as to give a rose tinted illumination. Fig. 6 also shows the fluorescent portion 15 of the reflector, supported a predetermined distance away from contact with the source by means of a heat resisting portion 15, which may be of metal, asbestos, etc., and constructed with draft passages 17, adapted to permit a draft, thereby improving the heat insulation of the sensitive material at 15.

It will readily be seen that the adaptations of the light transformer for various forms of illuminants, are practically unlimited, but those shown will serve in general to illustrate the applications.

The active materials to be used in the above described and illustrated arrangements or in any other known or desired arrangement, may be any of the forms hereinbefore described. Illustrative examples of the functional relations available are illustrated in Figs. 7, 8, and 9, which, as before stated, are exaggerated or schematic views intended to illustrate the functional relations. It will be understood that in said figures no attempt is made to show the real appearance or portions of parts, since this would be impossible.

As indicated by the legends thereon, Fig. 7 shows a fluorescent film or coating applied to a light scattering surface, of which white porcelain is named as an example of a material having such surface.

In Fig. 8 the fluorescent film or coating is shown as applied to a light scattering surface, such as paper or calcimine, which latter may be itself secured to or coated upon a more substantial support, as indicated.

In both Figs. 7 and 8, it will be understood that the exact physical dimensions of the parts may or may not be as shown and that the fluorescent film or coating may be such as results from painting the mixture upon the light scattering surface and then permitting it to dry, or such as results from forming a film upon glass, drying, stripping, and then applying to the light scattering surface in perfect or intimate contact therewith. Where the light scattering surface, indicated in Fig. 8, is calcimine, it may be applied initially to the front side of the support, or it may be painted upon the back side of the film before the latter is applied to the support.

Fig. 9 shows a fluorescent material with internal light scattering surface indicated by the dots therein. It will be understood that the thickness of the material represented by Fig. 9 may vary from that of a mere varnish coat to that of a sheet of considerable thickness. Such material may be used as a separate sheet or may be used in any of the relations of the films or coatings shown in Figs. 7 and 8, though it will be understood that being provided with internal light scattering surface, a light scattering background may be omitted, if desired.

While I have herein fully shown and described, and have pointed out in the appended claims certain novel features of my invention, it will be understood by those skilled in the art that various omissions, substitutions, and changes in the forms, proportions, sizes, and details of the device, of the materials used, and of their operation, may be made without departing from my invention.

In another application filed by me July 23rd, 1910, Serial No. 573,557, claims are made to certain features described herein.

I claim as my invention:

1. A light transforming reflector consisting of a translucent material carrying a fluorescent material, free from light absorbent particles, and formed or provided with a reflecting surface of the white or light scattering type.

2. A wave transforming reflector consisting of a translucent sheet comprising translucent material carrying a fluorescent material substantially free from light absorbent particles, and a backing consisting of a reflector surface of the white or light scattering type in intimate contact with the rear surface of said sheet.

3. A wave transforming reflector consisting of a translucent sheet comprising a fluorescent material and translucent carrier therefor, and a translucent fluorescence promoting material and a backing consisting of a reflector surface of the white or light scattering type in intimate contact with the rear surface of said sheet.

4. A light transforming reflector consisting of a sheet of translucent material carrying a fluorescent material, free from light absorbent particles, and a reflecting surface of the white or light scattering type forming a reflecting backing and a physical support for said sheet.

5. A reflector comprising a suitable support and snow white coating painted thereon and a sheet of light transforming material comprising a non-rigid or flexible translucent material carrying a fluorescent material.

6. A reflector comprising a suitable support and snow white coating painted thereon and, formed on the latter, a sheet of light transforming material comprising fluorescent material, a translucent carrier therefor and a translucent fluorescence promoting material combined with the carrier.

7. A fluorescent body comprising a sheet or film of composite material, adapted to be used in the relation of a light reflector, said composite material consisting of a fluorescent material, a carrier therefor, and a promoting material, said sheet being formed or provided with light diffusing reflecting surface.

8. A fluorescent body comprising a sheet or film of flexible composite material, adapted to be used in the relation of a light reflector, said composite material consisting of a fluorescent material, a translucent carrier therefor, and a promoting material, the sheets being backed by a reflecting and light diffusing surface.

9. A fluorescent body comprising a sheet or film of composite material, adapted to be used in the relation of a light reflector, said composite material consisting of a material capable of fluorescence, a carrier therefor, and a promoting material, the front surface of said sheet being light transmitting and the rear surface thereof being surface reflecting and light diffusing.

Signed at New York, in the county of New York, and State of New York, this 15th day of September, A. D. 1909.

PETER COOPER HEWITT.

Witnesses:
R. A. HEWITT,
COLES CARPENTER.